Feb. 13, 1968   T. D. H. ANDREWS ETAL   3,368,497
SPEED CONTROL DEVICES FOR FREE-RUNNING RAILWAY VEHICLES
Filed Nov. 24, 1965                                     2 Sheets-Sheet 1

INVENTORS
THOMAS D. H. ANDREWS
PETER E. CHECKLEY
COLIN R. LITTLE
Orland M. Christensen
ATTORNEY Feb. 13, 1968  T. D. H. ANDREWS ET AL  3,368,497
SPEED CONTROL DEVICES FOR FREE-RUNNING RAILWAY VEHICLES
Filed Nov. 24, 1965  2 Sheets-Sheet 2

INVENTORS
THOMAS D. H. ANDREWS
PETER F. CHECKLEY
COLIN R. LITTLE
Orland M. Christensen
ATTORNEY

United States Patent Office 3,368,497
Patented Feb. 13, 1968

3,368,497
SPEED CONTROL DEVICES FOR FREE-RUNNING
RAILWAY VEHICLES
Thomas D. H. Andrews, Cheltenham, Peter E. Checkley, Charlton Kings, and Colin R. Little, Cheltenham, England, assignors to Dowty Mining Equipment Limited
Filed Nov. 24, 1965, Ser. No. 509,485
Claims priority, application Great Britain, Nov. 26, 1964, 48,115/64
3 Claims. (Cl. 104—162)

ABSTRACT OF THE DISCLOSURE

In a telescopic device having a cylinder member mounted on a railway track so that the piston member is contracted into the cylinder and then extends as a vehicle wheel rolls over the device, and in which the fluid pressure is controlled during said contraction and extension whereby the piston member exerts either a retarding force or an accelerating force against the vehicle wheel, an element directly engageable by the wheel is connected to the head of the piston member by a resilient mounting which cushions the impact of an approaching wheel against said element.

---

This invention relates to speed control devices for free running railway vehicles, of the kind having a generally vertically movable head arranged in relation to a track rail to act against the periphery of a vehicle wheel rolling along the rail.

Telescopic hydraulic devices to which the invention is applicable are described in U.S. Patent No. 3,040,676 and in U.S. Patent No. 3,148,633. One such device capable of retarding fast moving vehicles includes speed-sensitive valve mechanism providing high fluid pressure resistance to contraction of the telescopic device, but allowing extension to take place under low pressure. Another such device has the added capability of accelerating slow moving vehicles, in which the valve mechanism provides low fluid pressure resistance to contraction of the device, but causes extension under high pressure from an external source. Yet another device has the accelerating function only.

According to the invention a speed control device for free running railway vehicles has a force-applying member arranged to act against the periphery of a vehicle wheel through the intermediary of a wheel-engageable element which is movable in a generally vertical direction, wherein resilient means is interposed between said element and the force-applying member capable of cushioning the impact of a moving wheel against said element.

Figure 1:
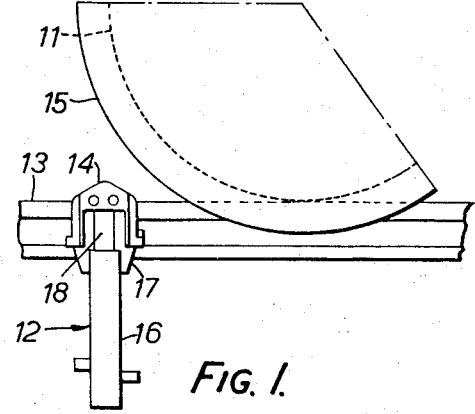
Figure 2:
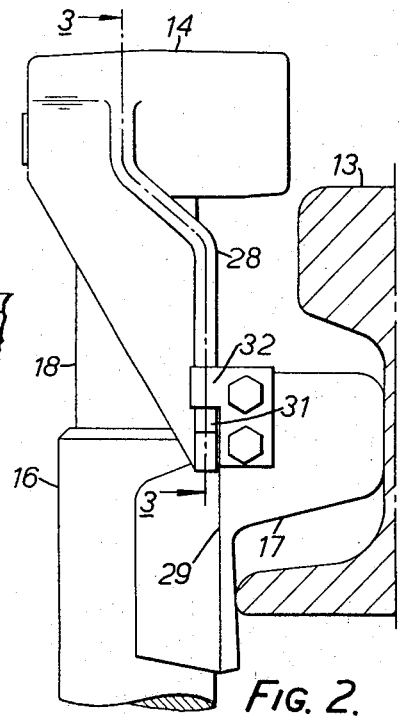

The invention is illustrated in the accompanying drawings, of which:

FIGURE 1 shows a flanged wheel of a railway vehicle approaching a speed control device of the kind referred to which is mounted against a rail, FIGURE 2 is an elevation view in the direction of the rail of the upper part of a speed control device forming one embodiment of the invention.

Figure 3:
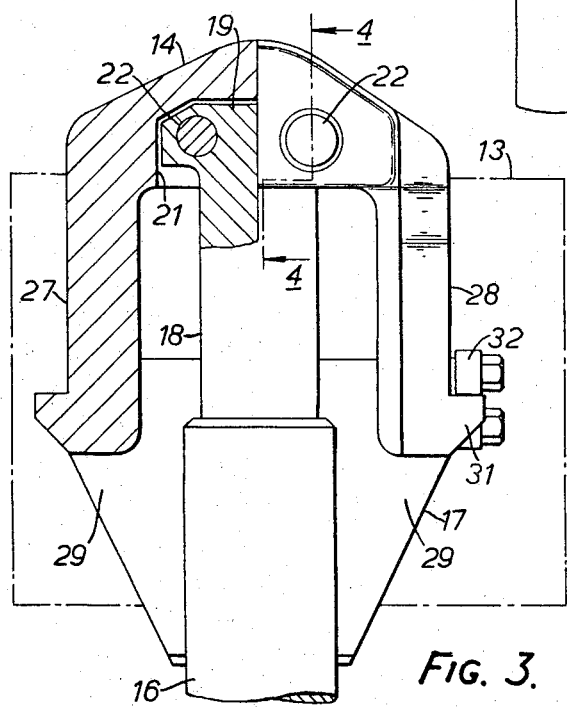
Figure 4:
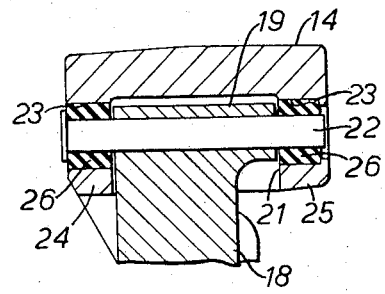
Figures 5, 6:
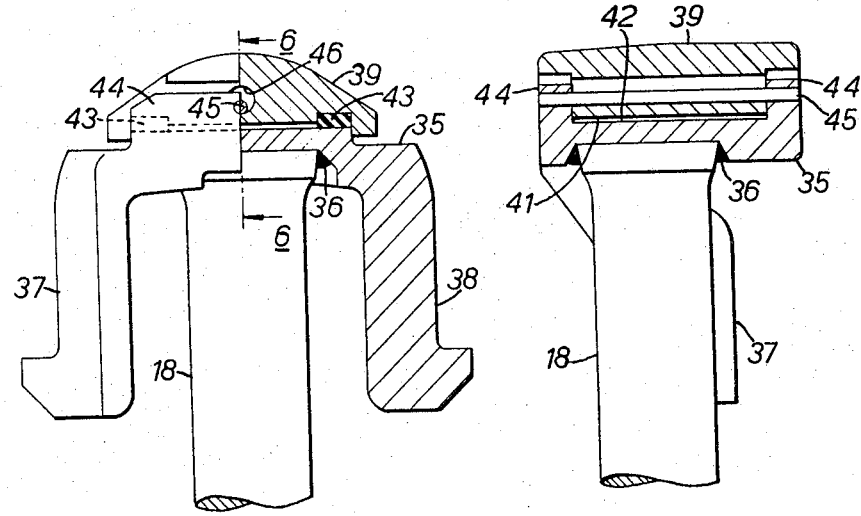

FIGURE 3 is an elevation view perpendicular to that of FIGURE 2, in which a portion on the left hand side of the center line is shown in section on line 3—3 of FIGURE 2, FIGURE 4 is a sectional detail on the line 4—4 of FIGURE 3, FIGURE 5 is an elevation view of another embodiment of the invention in which a portion on the right hand side of the center line is shown in section, and FIGURE 6 is a view partly in section on the line 6—6 of FIGURE 5.

In FIGURE 1 a vehicle wheel 11 is shown approaching a telescopic hydraulic speed control device 12 which comprises a cylinder 16 mounted on the inner side of a rail 13 by means of a bracket 17, and a piston 18 constituting a force-applying member, having at its upper end an element 14 in position to be engaged by a flange 15 of the wheel 11.

The initial engagement of the rigid wheel flange 15 against the element 14 will be in the nature of an impact which, over the higher part of the range of wheel speeds, will impose considerable mechanical and hydraulic shock loads on the device.

One arrangement for reducing such shock loads is shown in the embodiment of FIGURES 2, 3 and 4. In this, the piston 18 is formed with a head 19 which, in plan, is of generally rectangular form. The wheel-engageable element 14 is formed as a cap having a cavity 21 on the underside. Two pins 22 are fixed in the piston head 19 on opposite sides of the central axis of the piston. The pins 22 project at opposite ends through co-axial bores 23 formed in opposite walls 24, 25 of the cavity 21, and a resilient rubber bushing 26 is interposed between the end portion of each pin 22 and the respective bore 23. The cavity 21 is of such a size that when the cap 14 is thus mounted, there is clearance between the piston head 19 and the cavity which allows relative movement under shock load on the cap 14 against the restoring force of the rubber bushings 26.

The cap 14 has a convex upper face which is engageable by the wheel flange 15, and it has downwardly extending ears 27 and 28 which slide over guide faces 29 on the bracket 17 to prevent the cap 14 turning during telescopic movement of the device. The ear 28 has a projection 31 which is engageable with a stop 32 attached to the bracket 17 to limit upward movement of the piston 18. The rubber bushings 26 not only cushion the shock load of the wheel flange 15 on the cap 14, but also cushion the shock at the end of upward movement of the piston 18 when the projection 31 engages the stop 32.

The embodiment of FIGURES 5 and 6 shows an arrangement at the upper end of the piston 18 in which a head 35 is fixed to the piston, for example by a welded joint 36. Downwardly extending ears 37, 38 are formed integrally with the head 35 for preventing turning, as previously described. A cap 39 has a convex upper surface for engagement by the wheel flange, and a flat lower surface 41 which is spaced from an upper surface 42 of the head 35 by two rubber blocks 43. The head 35 has a pair of parallel cheeks 44 which guide the cap 39 for vertical movement with respect to the head 35. A retaining pin 45 fits the cheeks 44 and passes through an oversize hole 46 in the cap, the clearance thereby provided permitting downward movement of the cap 39 under the impact of a wheel flange on the cap. This impact is cushioned by compression of the rubber blocks 43. In this embodiment the mass of the cap 39 subjected to the direct impact of the wheel flange is small compared with the mass of the piston 18 and the head 35 attached thereto.

We claim as our invention:
1. A telescopic hydraulic speed control device for free running railway vehicles comprising one telescopic member adapted for mounting in a generally vertical direction against a rail along which vehicle wheels roll, another telescopic member constituting a generally vertically movable force-applying member having a head portion, an element connected to said head portion in position to be engaged by the periphery of a wheel approaching the device whereby said element together with said other telescopic member are movable downwardly and then upwardly as the wheels rolls over said element, and resilient means included in the connection between the wheel-engageable element and said head portion, said resilient means being operable to cushion the impact of an approaching wheel against said element.

2. A telescopic hydraulic speed control device according to claim 1, wherein the resilient means comprises a number of resilient bushings each of which is disposed between a bore formed in one of the wheel-engageable elements and the head portion, and a pin provided on the other of said element or said portion.

3. A telescopic hydraulic speed control device according to claim 1 wherein the mounting for said one telescopic member includes guide elements, and the wheel engageable element has guide elements integral therewith which are co-operable with the first-mentioned guide elements to prevent relative rotation of the telescopic members.

References Cited

UNITED STATES PATENTS

| | | | |
|---|---|---|---|
| 1,349,387 | 8/1920 | Simpson | 104—253 |
| 1,602,922 | 10/1926 | Midboe | 293—88 |
| 1,619,087 | 3/1927 | Pampinella | 293—88 |
| 1,825,899 | 10/1931 | Deloison | 104—259 X |
| 3,107,633 | 10/1963 | Bick | 104—162 |

ARTHUR L. LA POINT, *Primary Examiner.*

J. E. BABER, D. F. WORTH, *Assistant Examiners.*